US007632326B2

(12) United States Patent
Stemmer

(10) Patent No.: US 7,632,326 B2
(45) Date of Patent: Dec. 15, 2009

(54) COMPENSATING SHAFT MODULE

(75) Inventor: Xaver Stemmer, Reichersthofen (DE)

(73) Assignee: Audi AG, Ingolstadt (DE)

( * ) Notice: Subject to any disclaimer, the term of this patent is extended or adjusted under 35 U.S.C. 154(b) by 132 days.

(21) Appl. No.: 11/887,067

(22) PCT Filed: Mar. 8, 2006

(86) PCT No.: PCT/EP2006/002104

§ 371 (c)(1),
(2), (4) Date: Sep. 25, 2007

(87) PCT Pub. No.: WO2006/102968

PCT Pub. Date: Oct. 5, 2006

(65) Prior Publication Data

US 2009/0049807 A1 Feb. 26, 2009

(30) Foreign Application Priority Data

Mar. 26, 2005 (DE) ....................... 10 2005 013 803

(51) Int. Cl.
*B01D 46/18* (2006.01)

(52) U.S. Cl. .......................... 55/400; 55/385.3; 55/406; 55/408; 55/409; 55/DIG. 19; 95/31; 95/34; 95/35; 123/198 E

(58) Field of Classification Search ................ 55/385.3, 55/400, 406, 408–409, DIG. 19; 95/31, 34–35; 123/198 E
See application file for complete search history.

(56) References Cited

U.S. PATENT DOCUMENTS 2,459,944 A * 1/1949 Jones et al. ................... 55/407
2,575,315 A * 11/1951 Edwards ................. 123/196 A
2,610,788 A * 9/1952 Edwards ....................... 494/38
2,738,779 A * 3/1956 Christianson et al. .... 123/41.86
3,078,958 A * 2/1963 Hoenick .................... 184/6.24
4,284,504 A * 8/1981 Alexander et al. ..... 210/167.04
4,329,968 A 5/1982 Ishikawa et al.
6,279,553 B1 8/2001 Brueggemann et al.
6,723,149 B2 * 4/2004 Ernst et al. ..................... 55/498
6,755,896 B2 * 6/2004 Szepessy et al. .............. 95/270
6,821,319 B1 * 11/2004 Moberg et al. ................ 95/270

(Continued)

FOREIGN PATENT DOCUMENTS

DE 101 39 141 2/2003

(Continued)

*Primary Examiner*—Jason M Greene
*Assistant Examiner*—Dung Bui
(74) *Attorney, Agent, or Firm*—Novak Druce & Quigg LLP

(57) ABSTRACT

A module mountable in the crankcase of a vehicle for removing gases therefrom including a housing having an opening communicable with the crankcase, a set of bearings disposed in such housing, a hollow shaft journaled in such bearing having first and second partitions providing first and second axially disposed chambers, cooperating with said housing to provide first and second annular chamber, such shaft having a passageway intercommunicating the first axial chamber and the first annular chamber, a passageway intercommunicating the first axial chamber and the second annular chamber and a passageway intercommunicating the second axial chamber and the second annular chamber, a spiral, centrifugal separator mounted on such shaft in the first annular chamber, and a pillar mounted on the shaft in the second annular chamber and means connectable to motive means for rotating such shaft.

9 Claims, 1 Drawing Sheet

U.S. PATENT DOCUMENTS

| | | | | |
|---|---|---|---|---|
| 7,052,529 | B2 * | 5/2006 | Franzen et al. | 95/270 |
| 7,476,266 | B2 * | 1/2009 | Hallgren et al. | 55/406 |
| 2006/0162325 | A1 * | 7/2006 | Darley et al. | 60/317 |
| 2007/0084194 | A1 * | 4/2007 | Holm | 60/283 |
| 2008/0035103 | A1 * | 2/2008 | Barris et al. | 123/198 E |

FOREIGN PATENT DOCUMENTS

| | | |
|---|---|---|
| JP | 57193708 | 11/1982 |
| JP | 60209620 | 3/1986 |
| JP | 11022443 | 1/1999 |

* cited by examiner

COMPENSATING SHAFT MODULE

CROSS-REFERENCE TO RELATED APPLICATIONS

This application claims priority from German Application No. 102005013803.9 filed Mar. 26, 2005, hereby incorporated by reference in its entirety.

The invention relates to a compensating shaft module of an internal combustion engine of a motor vehicle or the like, with a compensating shaft and a cartridge which accommodates the compensating shaft at least in certain sections and holds it by means of bearings, the cartridge having at least one raw blowby gas entry opening which is connected to a centrifugal separator of the compensating shaft, and with a conveying means which conveys the blowby gas within the compensating shaft, which means has an impeller on the compensating shaft which has a clean blowby gas exit opening downstream from the conveying means.

BACKGROUND OF THE INVENTION

Use of at least one compensating shaft in internal combustion engines of motor vehicles or the like for balancing of the mass forces of the crank mechanism are known. Compensating shafts such as these can furthermore alternatively or additionally effect gas force equalization.

The object of the invention is to expand the range of application of a compensating shaft so that especially with a simple structure and reliable operation other functions are assumed.

SUMMARY OF THE INVENTION

This object is achieved by the compensating shaft module of an internal combustion engine of a motor vehicle or the like in that the module is provided with a compensating shaft and a cartridge which accommodates the compensating shaft at least in certain areas and holds it by means of bearings, the cartridge having at least one raw blowby gas entry opening which is connected to the centrifugal separator of the compensating shaft, and with a conveying means which conveys the blowby gas within the compensating shaft, which means has an impeller on the compensating shaft which has a clean blowby gas exit opening downstream from the conveying means. In this way the compensating shaft assumes not only equalization of mass forces and/or gas forces, but routes the blowby gas back to the intake line and/or a supercharger means of the internal combustion engine, this taking place in particular on a relatively short path and in a relatively high-temperature zone of the internal combustion engine. The blowby gas is formed by inevitable leaks of the combustion chambers of the internal combustion engine, i.e., the blowby gas traveling past the piston ring of the internal combustion engine into the interior of the engine and thus into the crankcase is returned via the compensating shaft, so that with a very small structural space requirement, low mass use and low costs, a simple solution is devised. In order to form a flow path for the blowby gas, the compensating shaft module in addition to the compensating shaft has a cartridge in which the compensating shaft is rotationally accommodated by means of bearings. Consequently the compensating shaft turns in operation, while the cartridge remains stationary. For entry of the raw blowby gas which is loaded in particular with oil droplets and the like into the cartridge, it has at least one raw blowby gas entry opening which is connected to a centrifugal separator of the compensating shaft. Raw blowby gas which has entered thus travels to the centrifugal separator, by which the particles contained in the gas, especially oil droplets, are separated by the action of a centrifugal force. In this way, the raw blowby gas becomes clean blowby gas which is supplied to at least one clean blowby gas exit opening of the compensating shaft. From here the clean blowby gas can be supplied to the intake line and/or the supercharger of the internal combustion engine. The blowby gas is conveyed by a conveying means of the compensating shaft module, the impeller of the conveying means being located on the compensating shaft, that is, being arranged non-rotatably on it, and thus having the same rpm as the compensating shaft. Rotation of the compensating shaft is accordingly used for conveyance of the blowby gas. In this connection it must always be ensured that compared to the pressure conditions in the interior of the crankcase within the compensating shaft a negative pressure prevails in order to produce the desired blowby gas flow and to allow it to emerge from the clean blowby gas exit opening.

One development of the invention calls for the conveying means to be a pump, in particular a side channel pump. As mentioned in the foregoing, the impeller of the pump is driven by means of the compensating shaft. The stationary parts of the pump, that is, the pump housing, is stationary and belongs to the cartridge in particular.

Furthermore, it is advantageous if the centrifugal separator is a centrifugal oil separator. The raw blowby gas is laden especially with extremely fine oil droplets which are for the most part separated by means of the centrifugal oil separator so that the contaminated raw blowby gas becomes clean blowby gas. The separated oil droplets are returned to the oil circuit of the internal combustion engine.

One development of the invention calls for the centrifugal separator to have at least one centrifugal element located on one element of the compensating shaft for separation of particles from the raw blowby gas. The raw gas comes into contact with the centrifugal element. In the process the particles settle on the centrifugal element and are conveyed by the action of centrifugal force radially to the outside and in this way collected and returned to the engine lubricant circuit.

In particular, it is provided that the centrifugal element is a conveyor worm. The wall of the conveyor worm performs a double function by on the one hand its being used as a centrifugal element and accordingly settling and radially discharging especially oil droplets, the oil droplets finally being collected as an oil film on the inside of the cartridge, and on the other hand by the conveying action of the conveyor worm leading to this oil film's being conveyed in the direction to the raw blowby gas entry opening so that the collected oil can emerge there and can be routed to the oilpan of the internal combustion engine.

Furthermore it is advantageous if the output end of the conveyor worm is located in the area of the raw blowby gas entry opening in order to return the separated oil to the crankcase.

One development of the invention calls for a negative pressure to be formed relative to the gas pressure in the crankcase of the internal combustion engine within the compensating shaft by the gas conveyor action of the conveying means and against the gas conveyor action of the centrifugal separator at any rpm of the compensating shaft. The conveying means accordingly provides for generation of a negative pressure in the compensating shaft, the centrifugal separator settling not only the particles from the blowby gas, but especially as a result of its particle conveyor action, especially when there is a conveyor worm, in this way a gas conveyor action is also caused which however acts against the gas conveyor action of the conveying means. The arrangement must therefore always be such that the gas conveyor action of the conveying means prevails over the gas conveyor action of the centrifugal separator in order to create the desired negative pressure in the compensating shaft, so that the blowby gas in the crankcase flows into the interior of the compensating shaft. This negative pressure action which is necessary for gas conveyance must be ensured at any rpm of the compensating shaft and accordingly at any rpm of the internal combustion engine. If the internal combustion engine has a higher rpm, accordingly in the crankcase the pressure of the blowby gas rises since the amount of blowby gas rises. Accordingly the conveyor action within the compensating shaft must also be increased to form a pressure gradient between the gas pressure in the crankcase and the gas pressure in the compensating shaft.

It is advantageous if the raw blowby gas entry opening is a radial opening. Preferably there are several entry openings which are located spaced apart from one another and distributed over the periphery of the cartridge.

The clean blowby gas exit opening is located on the compensating shaft, preferably on the end of the compensating shaft element which is designed in particular as a hollow shaft or as a compensating shaft pipe.

Provision can be made so that the conveyor worm has two worm sections which are coiled in opposite directions, at least one raw blowby gas entry opening at a time being associated with the respective output ends of the conveyor worm sections. The conveyor direction of the two conveyor worm sections is opposite one another, i.e., the separated particles are transported more or less from the center of the conveyor worm composed of the two conveyor worm sections either from one conveyor worm section in the direction of one end of the compensating shaft or from the other conveyor worm section in the direction of the other end of the compensating shaft in order to travel to the associated raw blowby gas entry opening and to emerge there, i.e., the respective raw blowby gas entry opening therefore forms a particle outlet for the separated particles.

It is provided in particular that the raw gas which has entered through the raw blowby gas entry opening flows along a channel which has been formed between the cartridge and the compensating shaft element to the input section of the conveyor worm or to the input sections of the conveyor worm sections and that the compensating shaft element in the area of the input section or the input sections has at least one gas opening which leads into the interior of the compensating shaft element. As a result of this gas routing, contact of the raw gas as intensive as possible with the centrifugal separator is ensured in order to be able to clean the gas as effectively as possible. The cleaned gas travels through the gas opening which leads into the interior of the compensating shaft element into an axial channel, preferably a central channel which runs coaxially to the axis of rotation of the compensating shaft in order to be able to be conveyed from there via the conveying means to the clean blowby gas exit opening.

It is advantageous if the channel is formed in the area of the spacers which bear the conveyor worm on the compensating shaft element. Accordingly it is an annular channel with an axial length corresponding to the length of the conveyor worm or of the respective conveyor worm sections. It is formed between the jacket surface of the compensating shaft element, that is, of the compensating shaft pipe and the centrifugal element of the centrifugal separator. The spacers create intermediate spaces sufficient for the gas to be able to flow and the particles to be able to settle.

One development of the invention calls for the conveying means to have a conveyor housing which is associated with the cartridge and accordingly is stationary in operation. The conveyor housing of the conveying means, especially the side channel pump, has gas supply and gas discharge spaces matched to the impeller which is located on the compensating shaft.

In order to transport the cleaned blowby gas from the interior of the compensating shaft into the conveyor housing and from there via the conveyor housing again into the interior of the compensating shaft, the input side of the conveyor housing is connected to the interior of the compensating shaft element via at least one gas outlet opening which radially penetrates the compensating shaft element. So that the gas flow from the impeller can re-enter the interior of the compensating shaft, the output side of the conveyor housing is connected to the interior of the compensating shaft element via at least one gas inlet opening which radially penetrates the compensating shaft element. Preferably there are several gas outlet openings and gas inlet openings which are spaced apart from one another and which are located peripherally on the compensating shaft element.

One development of the invention calls for the interior of the compensating shaft between the gas inlet opening and the gas outlet opening to have an axial closure so that the conveying means is not short circuited, so that therefore a bypass is not formed to the conveying means.

It is advantageous if the bearings of the compensating shaft are arranged such that the bearing lubricant emerging from them travels to the raw blowby gas entry opening. In this way bearing lubricant, especially oil, is returned to the lubricant circuit of the internal combustion engine.

One development of the invention calls for at least one bearing lubricant channel which leads to the raw blowby gas entry opening and which is associated with the cartridge. This bearing lubricant channel can axially bridge the bearing. In this way bearing lubricant is conveyed from one bearing side to the other bearing side in order to travel to the raw blowby gas entry opening which is located there.

Finally it is advantageous if the clean blowby gas exit opening is connected to an intake pipe and/or a supercharger of the internal combustion engine in order to supply blowby gas to the intake line or supercharger line.

The drawings illustrate the invention using one embodiment.

DETAILED DESCRIPTION OF AN EMBODIMENT OF THE INVENTION

Figure 1:
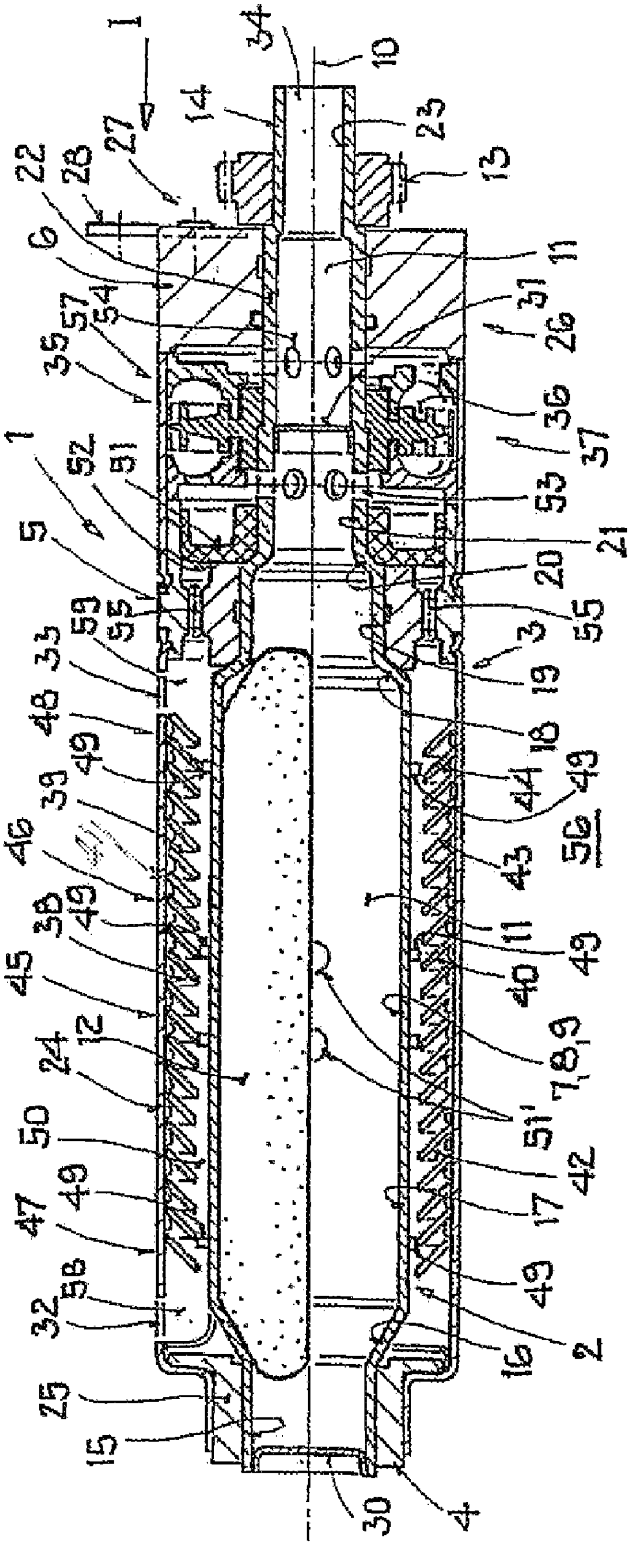
FIG. 1 shows a lengthwise section through the compensating shaft module.
Figure 2:
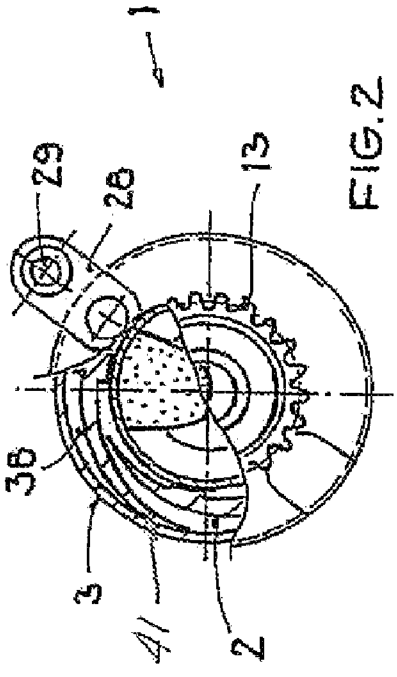
FIG. 2 shows a front view of the compensating shaft module of FIG. 1 in the direction of arrow 1 of FIG. 1, the representation being cutaway in certain sections.

FIGS. 1 and 2 show a compensating shaft module 1 for an internal combustion engine of a motor vehicle or the like. The compensating shaft module 1 has a compensating shaft 2 and a cartridge 3 which is stationary when the compensating shaft 2 is turning. The compensating shaft 2 is pivot-mounted in the cartridge 3 by means of bearings 4, 5 and 6. The compensating shaft 2 has a compensating shaft element 7 in the form of a compensating shaft pipe 8 which accordingly forms a hollow shaft 9. Eccentrically to the axis of rotation 10 of the compensating shaft 2 in its interior 11 there is a balancing weight 12. Rotary driving of the compensating shaft 2 takes place via a driving gear 13 which is connected nonrotatably to it and which is located on a hollow shaft connecting piece 14 which projects out of the cartridge 3. The compensating shaft pipe 8 has a cylindrical section 15 which undergoes transition into a conically widening section 16. This is followed by a cylindrical section 17 which has a larger diameter that the cylindrical section 15 and which undergoes transition into a conically diminishing section 18. A cylindrical section 19 follows. It has the same diameter as the cylindrical section 15. It is connected to a conically diminishing section 20 followed by a cylindrical section which undergoes transition into a cylindrical section 22 which is somewhat smaller in diameter and which is connected to a cylindrical section 23 which is still smaller in diameter and which forms the hollow shaft connecting piece 14. The cartridge 3 is made tubular and has a cylindrical section 24 which undergoes transition on one end into a cylindrical section 25 which is smaller in diameter and its other end area 26 is closed axially by means of the bearing 6. For mounting, in the area of this front end 27 there is a mounting clip 28 which has an attachment opening 29 for a fastener, for example a threaded screw.

The cylindrical section 15 of the compensating shaft pipe 8 is sealed by means of a closure element 30. In the transition zone from cylindrical section 21 to cylindrical section 22 there is an axial closure 31. A bearing 4 is located in the area of the cylindrical section 15; a bearing 5 is located in the area of the cylindrical section 19, and a bearing 6 is located in the area of the cylindrical section 22 which borders the cylindrical section 23. In the area of the conical section 16 the cartridge 3 has several raw blowby gas entry openings 32 which are spaced peripherally apart from one another and which are located distributed over the periphery. In the area of the cylindrical section 17, and bordering the conical section 18, the cartridge 3 has several peripheral raw blowby gas entry openings 33 which are arranged spaced apart from one another. For the sake of simplicity only entry openings 32 and 33 will be discussed below. The end of the compensating shaft pipe 8 associated with the hollow shaft connecting piece 14 is made axially open so that a clean blowby gas exit opening 34 which will be referred to as exit opening 34 below for the sake of simplicity is formed there. The transition zone from the cylindrical section 21 and the cylindrical section 22 is associated with a conveying means 35 which has an impeller 36 which is connected nonrotatably to the compensating shaft pipe 8 and has a stationary conveyor housing 37 which is associated with the cartridge 3 and which extends on both sides of the impeller 36. In the area of the conical section 16 of the cylindrical section 17 and of the conical section 18 there is an eccentric balancing weight 12 in the interior 11 of the compensating shaft pipe 8. On the outside of the cylindrical section 17 of the compensating shaft pipe 8 there is a centrifugal separator 38 which is made as a centrifugal oil separator 39 and which has a centrifugal element 40 in the form of a conveyor worm 41 which is formed by two conveyor worm sections 42 and 43 which are coiled in opposite directions. The coil 44 of the conveyor worm 41 is made tilted in the same direction over the entire length of the centrifugal separator 38, although the two conveyor worm sections 42 and 43 have different conveyor directions, specifically conveyor directions which point opposite one another in order to be able to produce this element in a mold so that it can be removed from the mold without problems. The two conveyor worm sections 42 and 43 each have an input section 45 and 46, these two input sections 45 and 46 lying more or less in the center with respect to the lengthwise extension of the cylindrical section 17. Furthermore, the two conveyor worm sections 42 and 43 each have one output end 47 and 48, the output end 47 being associated with the entry opening 32 and the exit end 48 being associated with the entry opening 33. The conveyor worm 41 is attached nonrotatably by means of spacers 49 to the outer jacket surface of the cylindrical section 17 so that between the coil 44 and the outside of the compensating shaft pipe 8 an annular channel 50 is formed which extends over the entire length of the conveyor worm 41 and is connected to communicate with the entry openings 32 and 33 and communicates with the gas openings 51' which are associated with the middle area of the conveyor worm 41, which penetrate the compensating shaft pipe 8 and thus establish the connection from the channel 50 into the interior 11 of the compensating shaft pipe 8. The coil 44 has an outside diameter which is slightly smaller than the free interior of the cartridge in the area of its cylindrical section 24, so that there is only very little play to the coil 44 there.

The side of the bearing 5 which points in the direction to the conveying means 35 is opposite a centrifugal disk 51 which is attached nonrotatably on the compensating shaft pipe 8, a small gap 52 being formed relative to the centrifugal disk 51 and the bearing 5. The cylindrical section 21 is penetrated by several gas outlet openings 53 which are arranged spaced apart from one another peripherally. Gas inlet openings 54 which are located and formed accordingly are located in the area of the cylindrical section 22, the gas outlet openings 53 and the gas inlet openings 54 penetrating the compensating shaft pipe 8. The gas outlet openings 53 lead into the interior of the conveyor housing 37 of the conveying means 35. The gas outlet openings 54 lead from the interior of the conveyor housing 37 into the interior 11 of the hollow shaft 9. The arrangement is such that the gas outlet openings 53 lie on one side of the axial closure 31 and the gas inlet openings 54 lie on the other side of the axial closure 31. The bearing 5 is penetrated by several lubricant channels 55 which are arranged peripherally distributed and which connect the gap 52 to the entry openings 33. Outside the cartridge 3 is the interior of the crankcase 56 of an internal combustion engine which is not shown, i.e., the compensating shaft module 1 is located within the crankcase 56. The exit opening 34 leads to an intake line which is not shown or to a supercharger of the internal combustion engine which is not shown.

The following function arises: The internal combustion engine of the motor vehicle, which engine is not shown, drives via a driving gear 13 the compensating shaft 2 which turns according to the rpm of the internal combustion engine, and is supported by bearings 4, 5, and 6 which are located within the cartridge 3. As a result of this rotary motion of the compensating shaft 2, the impeller 36 of the conveying means 35 which forms the side channel pump 57 is turned, by which in the interior 11 of the compensating shaft pipe 8 a negative pressure forms which constitutes a pressure gradient to the interior of the crankcase 56. In this way raw blowby gas escaping past the piston rings from the cylinders of the internal combustion engine is intaken via the entry openings 32 and 33. The blowby gas enters the annular channel 50 and travels in this way to the centrifugal element 40 which is formed by the conveyor worm 41. Since the conveyor worm 41 is formed by two conveyor worm sections 42 and 43 which are coiled in opposite directions, particles which are located on the centrifugal element 40 and which have been separated from the raw blowby gas, especially oil droplets, are transported radially to the outside and in the process strike the inside jacket surface of the cylindrical sections 24 of the cartridge 3 and are transported in the direction to the entry openings 32 and 33 as continually growing drops or as a developing lubricant film, especially an oil film, as a result of the conveyor action of the two conveyor worm sections 42 and 43. Finally, the lubricant film or oil film which has been formed in this way emerges from the entry openings 32 and 33 which accordingly form particle outlets 58 and 59.

The raw blowby gas which has been cleaned by the centrifugal separator 38 now enters the interior 11 of the compensating shaft pipe 8 in the cylindrical section 17 through the gas openings 51' as clean blowby gas and as a result of the suction action of the side channel pump 57 travels to the gas outlet openings 53. The gas flow thus leaves the interior 11 of the compensating shaft pipe 8 and travels via one side of the conveyor housing 37 to the impeller 36 and from there to the other side of the conveyor housing 37, and then radially to the inside through the gas entry openings again enters the interior 11 of the compensating shaft pipe 8 and finally flows to the exit opening 34 and in this way in cleaned form to the intake line of the internal combustion engine or to one or more superchargers there.

Lubricant emerging from the bearing 4 is intaken as a result of the suction action of the raw blowby gas entering the entry openings 32 and travels to the conical section 16 and from there to the entry openings 32. Consequently this emerging bearing lubricant combines with the oil film which originates from the centrifugal separator 38. Bearing lubricant emerging from the bearing 5 travels either via an annular gap formed between the bearing 5 and the conical section 18 directly to the entry openings 33 or on the other side of the bearing 5 to the gap 52 and therefore comes into contact with the centrifugal disk 51 which effects radial transport so that the bearing lubricant, especially as a lubricant film, is routed through the lubricant channels 55 and as far as to the entry openings 33 so that here combination with the lubricant which is conveyed by the centrifugal separator 38 takes place.

It is apparent from the aforementioned that particles which have been separated from the blowby gas, especially separated oil, are returned to the interior of the crankcase 36 and that the cleaned blowby gas is supplied again to the internal combustion engine.

As a result of this gas return which takes up very little structural space, the compensating shaft module is made only slightly larger in diameter than known compensating shafts which do not convey gas. Furthermore, gas return takes place in the zone of the engine which has a high temperature so that icing phenomena, etc., need not be feared. Furthermore the illustrated design has very low mass since hardly any additional components have to be used.

Reference Number List

1 compensating shaft module
2 compensating shaft
3 cartridge
4 bearing
5 bearing
6 bearing
7 compensating shaft element
8 compensating shaft pipe
9 hollow shaft
10 axis of rotation
11 interior
12 balancing weight
13 driving gear
14 hollow shaft connecting piece
15 cylindrical section
16 conical section
17 cylindrical section
18 conical section
19 cylindrical section
20 conical section
21 cylindrical section
22 cylindrical section
23 cylindrical section
24 cylindrical section
25 cylindrical section
26 end section
27 front end
28 mounting clip
29 attachment opening
30 closure element
31 axial closure
32 raw blowby gas entry opening
33 raw blowby gas entry opening
34 clean blowby gas exit opening
35 conveying means
36 impeller
37 conveyor housing
38 centrifugal separator
39 centrifugal oil separator
40 centrifugal element
41 conveyor worm
42 conveyor worm section
43 conveyor worm section
44 coil
45 input section
46 input section
47 output end
48 output end
49 spacer
50 channel
51 centrifugal disk
51' gas openings
52 gap
53 gas outlet openings
54 gas inlet openings
55 lubricant channel
56 crankcase
57 side channel pump
58 particle outlets
59 particle outlets

The invention claimed is:

1. A module mountable in the crankcase of a vehicle for removing gases therefrom, comprising:

a housing having an opening communicable with said crankcase;

a set of bearings mounted in said housing;

a hollow shaft having first and second partitions providing a first, axially disposed closed chamber and a second, axially disposed chamber having an axially disposed outlet, said shaft being journaled in said bearings and cooperating with said housing and a pair of said bearings to provide a first annular chamber communicating with said crankcase through said opening in said housing and with said first axially disposed chamber of said shaft through a first shaft wall passageway, and cooperating with said housing and a pair of said bearings to provide a second annular chamber communicating with said first axial chamber of said shaft through a second shaft wall passageway and with said second axial chamber of said shaft through a third shaft wall passageway;

a spiral, centrifugal separator mounted on and spaced from said hollow shaft, in said first annular chamber, about said first axially disposed closed chamber thereof;

an impeller mounted on said hollow shaft in said second annular chamber, between said second and third shaft wall passageways; and means connectable to motive means for rotating said shaft about the axis thereof to cause gas laden with oil droplets to be drawn through said housing inlet opening, subjected to centrifugal action separting said oil droplets from said gases, said separated oil droplets to be expelled through said housing opening and said separated gases to be expelled through said axially disposed outlet of said shaft induced by said impeller.

2. A module according to claim 1 wherein said centrifugal separator is functional to separate oil from grass drawn into said first annular chamber.

3. A module according to claim 1 wherein said centrifugal separator has a worm configuration.

4. A module according to claim 1 wherein said centrifugal separator in proximity to said housing opening.

5. A module according to claim 4 wherein said housing opening is disposed substantially radially relative to the axis of said shaft.

6. A module according to claim 3 wherein said centrifugal, separator is provided with two worm configured sections separated in opposite directions, and said housing includes a pair of inlets each disposed adjacent and in communication with an end of said separator.

7. A module according to claim 1 wherein lubricant supplied to said bearings is discharged in proximity to said housing opening.

8. A module according to claim 1 wherein said housing includes at least one outlet opening communicating with said first annular chamber for discharging particles generated by said centrifugal separator.

9. A module according to claim 1 wherein said second, axially disposed chamber is communicable with one of an intake conduit and a super charge of an internal combustion engine of a vehicle.

* * * * *

UNITED STATES PATENT AND TRADEMARK OFFICE

CERTIFICATE OF CORRECTION

PATENT NO. : 7,632,326 B2
APPLICATION NO. : 11/887067
DATED : December 15, 2009
INVENTOR(S) : Stemmer It is certified that error appears in the above-identified patent and that said Letters Patent is hereby corrected as shown below:

Col. 9, line 7 "grass" should be changed to --gas--

Col. 9, line 12 insert --is-- after "separator"

Signed and Sealed this

Twenty-ninth Day of June, 2010

David J. Kappos

David J. Kappos
*Director of the United States Patent and Trademark Office*